Nov. 13, 1962   A. D. CORBETT, JR., ET AL   3,064,137
POWER GENERATOR ACTUATED BY WAVE MOTION
Filed May 11, 1960

INVENTORS
ALBERT D. CORBETT, JR.
ELLIOT K. WEINBERG
DANIEL GOALWIN their AGENT

United States Patent Office 3,064,137
Patented Nov. 13, 1962

3,064,137
POWER GENERATOR ACTUATED BY WAVE MOTION
Albert D. Corbett, Jr., West Caldwell, Elliot K. Weinberg, Dover, and Daniel S. Goalwin, Morris Plains, N.J., assignors to Thiokol Chemical Corporation, Bristol, Pa., a corporation of Delaware
Filed May 11, 1960, Ser. No. 28,437
6 Claims. (Cl. 290—53)

This invention relates generally to a method of and apparatus for generating electrical energy and more particularly to a method of and apparatus for converting the natural energy of fresh and salt water wave motion to electrical energy which may be immediately utilized or stored as in a battery.

Many buoys in use today as navigational aids require a source of electrical energy over relatively long periods to power lights and other electrical devices as do other special purpose buoys, floats, etc. Storage batteries are currently being used and while their useful life may be more than ten years, their service life between rechargings is less than one year. However, the service life of conventional sea buoys is about two years at which time they must be replaced and overhauled, so that a similar service life for the electrical power system is naturally most desirable.

Various apparatus are known in the art for converting the kinetic energy of wave motion to electrical energy and many of these have been unsatisfactory in use due to a lack of awareness on the part of the designers that buoy movements or gyrations, effected by waves, are as complex as the motions of the ocean itself. Many factors influencing the motions are involved including wind, current, depth of water, shore effects, wakes, etc.

While the patterns of ocean, etc. movements are too complex for intuitive understanding, the various components can be isolated and considered as actuating forces which generate buoy movement. Although the resulting buoy movement is not a simple motion, it may be resolved into two basic modes: vertical movement or bobbing relative to a horizontal plane caused by the rise and fall of the waves; and rocking motion relative to the vertical axis caused by the shift of the metacenter of the buoy due to the slope of the wave front.

The bobbing motion is considered to be the primary mode particularly during periods of relative calm since it is desirable to stabilize light buoys so that the visibility of the light will not be reduced due to excessive rocking. While rocking motion is, of course, present and is also a potential source of energy, the present invention is directed toward the method of and apparatus for absorbing the energy available in the vertical or bobbing mode of oscillation.

Accordingly, the main object of the present invention is to provide an improved method of and apparatus for converting the energy of wave motion to electrical energy.

An important object of the present invention is to provide an improved method of and apparatus for automatically and continuously utilizing wave energy to compress air to power an air-turbine generator connected electrically with a light, signal, etc. and a battery.

Another important object of the present invention is to provide novel apparatus for practicing the method of converting wave energy to electrical energy, the apparatus being of unique though simple construction so as to be susceptible of ready and economic manufacture and of long, trouble-free life in use.

Other objects and advantages of the present invention will become apparent during the course of the following description.

In the drawings we have shown two forms of the invention and by which the novel method may be practiced. In these showings:

Figure 1:
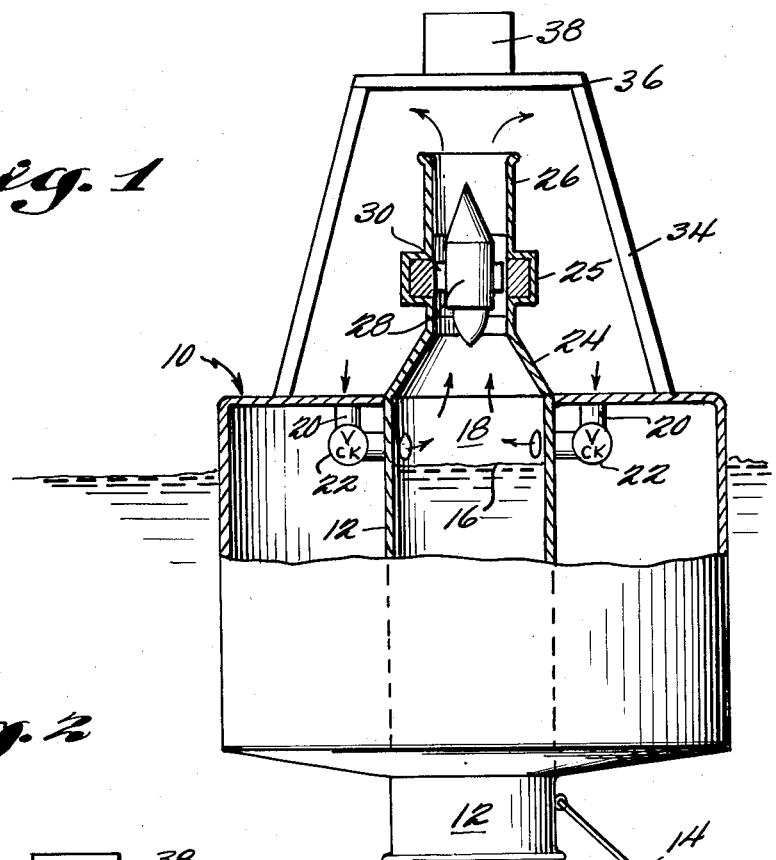
FIGURE 1 is a diagrammatic view partly in section of one form of apparatus comprising a part of the present invention.

In its broadest aspects, the present invention utilizes air as the working fluid which is compressed by the rise of a water column acting as a liquid piston, in a chamber within a supporting body, the air being expanded through an air-turbine generator which produces electrical energy for use and storage.

For purposes of illustration, the invention is disclosed as applied to a buoy although it will be understood that the supporting body may take any of various forms as long as there is relative vertical movement between the surface of the water and the body.

Referring to the drawings, numeral 10 designates the supporting body as a whole which is shown as a watertight, high inertia buoy having a standpipe 12 with an upper end portion open to the atmosphere, the pipe extending through and below the body and being open at its lower end. The buoy may be anchored in a given location by means of an anchor cable 14.

The level 16 of the water forming the liquid piston in the standpipe 12 defines a plenum 18 and tends to rise and fall in accordance with well known hydraulic principles.

As seen in FIGURE 1, air at atmospheric pressure is allowed to enter the plenum 18, when the water level 16 is receding, by a plurality of angularly spaced passages 20 controlled by check valves 22. The upper end of the standpipe 12 includes an upwardly tapered portion 24 supporting a sealed stator housing 25 and an upper standpipe portion 26 of materially lesser diameter. A permanent magnet rotor 28 having a single set of blades 30 is mounted on suitable bearings in the housing 25 and forms a restriction, and the spaces between the blades, of course, define restricted passages, at the upper end of the plenum 18 of communication with the atmosphere through the standpipe, which as shown, is open to the atmosphere.

Figure 2:
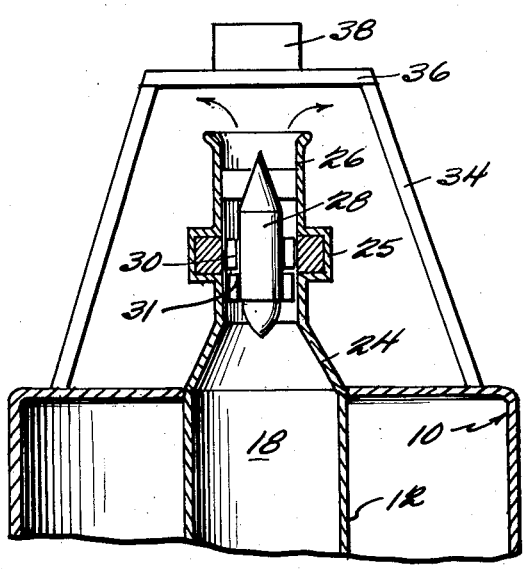
FIGURE 2 is a similar view of another form thereof.

The form of the apparatus shown in FIGURE 2 differs from that of FIGURE 1 in that the inflow of air from the atmosphere is through the turbine and the air inlet passages 20 and check valves 22 are omitted and the turbine rotor 28 is provided with a second set of blades 31 which are mounted so as to be free-wheeling in one direction with the blades 30 free-wheeling in the opposite direction, the pitch of each set of blades being such as to drive the generator in one direction only for both out-flow and in-flow of air. The supporting body or buoy 10 for the apparatus is provided with a framework 34 and platform 36 upon which the various elements 38 of the apparatus such as the light, signal, battery, circuit elements, etc. may be mounted.

The generator 25, 28 (FIGURE 3) may be a low voltage P.M. unit developing 2 watts. The only requirements imposed upon it are that it be a low speed unit with the output frequency sufficiently greater than the natural wave frequency so that it will have a negligible effect on the speed voltage modulation characteristics although this is not a stringent requirement. The Rg will be low so that too much energy will not be dissipated in the generator, but Rg will be high enough to act as a current limiting resistor so that the battery will not be burned out. As shown, the generator output is full wave rectified and then conducted to the battery.

Figure 3:
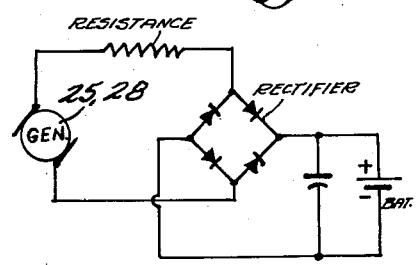
FIGURE 3 is a schematic showing of the electrical circuit.

In the operation of the apparatus of FIGURE 1, air is admitted through the passages 20 and check valves 22 into the plenum 18 as the water level 16 in the standpipe 12 drops between wave crests. As the trough of a wave passes and the next crest approaches, the water level 16 rises displacing the air in the plenum above it and causes the check valves 22 to close. The liquid piston then compresses the air in the plenum 18 due to the restriction in the standpipe effected by the turbine rotor 28 and its blades. The work done by the liquid piston in compressing the air is converted to kinetic energy by allowing it to expand through the restriction of turbine blades 30 and partially recovered in the form of mechanical energy which is converted to electrical energy by the alternating current generator 25, 28. As indicated in FIGURE 3, the alternating electrical energy is rectified and is conducted to and converted to chemical energy within the battery for storage and subsequent usage for the light, signal, etc. devices to be powered.

It will be appreciated that rotary movement of the rotor 28 of FIGURE 1 is substantially intermittent in accordance with the passing wave crests whereas rotary movement of the rotor 28 of FIGURE 2 is substantially constant due to the alternate additive turning efforts exerted by the two sets of rotor blades 30 and 31 as the air is expanded out through the turbine to drive one set of blades and then flows back in through the turbine as the liquid piston level 16 drops to drive the other set of blades.

It will now be readily apparent that the method of converting wave energy to electrical energy herein disclosed and the forms of apparatus provided therefor will maintain the charge in a battery by providing electrical power for the system indefinitely.

It is to be understood that the forms of the invention herewith shown and described are to be taken as preferred examples of the same and that various changes in the shape, size and arrangement of parts may be resorted to without departure from the spirit of the invention or the scope of the subjoined claims.

We claim:

1. Apparatus for converting the energy of wave motions to electrical energy comprising, in combination, a support adapted to be positioned in water waves, an open-ended standpipe mounted in and extending vertically through said support so that water enters said standpipe to the level of a surrounding wave, and a turbine generator including blades mounted in an upper portion of said standpipe to substantially close it to the atmosphere and defining a plenum between it and the water level therewithin, said blades defining restricted passages with the inner wall of said standpipe through which said plenum is in communication with the atmosphere, the rise in water level in said standpipe upon the passage of the crest of a wave acting to compress the air in said plenum and expand it through said restricted blade passages to the atmosphere and rotate the generator and produce electrical energy.

2. An apparatus as recited in claim 1 wherein additional communication means is provided between said plenum and the atmosphere and include check valves operable to closed position upon compression of the air within the plenum.

3. An apparatus as recited in claim 1 wherein said turbine generator includes two sets of blades, one operable by the expanding compressed air from the plenum and the other set by air entering said passages from the atmosphere upon lowering of said water level in said standpipe.

4. An apparatus as recited in claim 3 wherein both of said sets of blades rotate in the same direction.

5. An apparatus as recited in claim 1 wherein said support comprises a buoy, and electrical signalling, circuit, and storage elements are mounted thereon and have electrical connection with said generator.

6. The method of converting the energy of water wave motions to electrical energy comprising the steps of substantially confining a gas, partially confining a column of the wave water in contact with the gas, permitting hydrostatic communication of the water column with the water upon which the waves are formed so as to effect rises and falls in the level of the water column as the crests of waves approach and recede to alternately compress and replenish the gas, and expanding the compressed gas through vane operated electrical generators to produce electrical energy, said charge of confined gas being renewed after each compression and expansion and comprising air admitted from the atmosphere.

References Cited in the file of this patent

UNITED STATES PATENTS

| | | |
|---|---|---|
| 1,448,029 | Larry et al. | Mar. 13, 1923 |
| 2,871,790 | Weills | Feb. 3, 1959 |